United States Patent
Naik et al.

(10) Patent No.: US 11,240,678 B2
(45) Date of Patent: Feb. 1, 2022

(54) SYSTEM AND METHOD FOR IMPROVING INDOOR COVERAGE OF CELLULAR RECEPTION USING A SMART TELEVISION

(71) Applicant: Saankhya Labs Pvt. Ltd., Bangalore (IN)

(72) Inventors: Parag Naik, Bangalore (IN); Anindya Saha, Bangalore (IN); Gururaj Padaki, Bangalore (IN)

(73) Assignee: Saankhya Labs Pvt. Ltd., Bangalore (IN)

( * ) Notice: Subject to any disclaimer, the term of this patent is extended or adjusted under 35 U.S.C. 154(b) by 0 days.

(21) Appl. No.: 17/156,551

(22) Filed: Jan. 23, 2021

(65) Prior Publication Data
US 2021/0235280 A1    Jul. 29, 2021

(30) Foreign Application Priority Data
Jan. 23, 2020 (IN) .............................. 202041003082

(51) Int. Cl.
*H04W 88/10* (2009.01)
*H04W 16/20* (2009.01)
*H04W 24/02* (2009.01)

(52) U.S. Cl.
CPC ........... *H04W 16/20* (2013.01); *H04W 24/02* (2013.01)

(58) Field of Classification Search
CPC ................................................... H04W 84/045
See application file for complete search history.

(56) References Cited

U.S. PATENT DOCUMENTS

| | | | | |
|---|---|---|---|---|
| 2009/0325481 A1* | 12/2009 | Mohebbi | .............. | H04B 7/2606 455/15 |
| 2011/0103303 A1* | 5/2011 | Hsu | ........................ | H04W 76/12 370/328 |

* cited by examiner

*Primary Examiner* — Kevin Kim

(57) ABSTRACT

A system for improving indoor coverage of cellular reception is provided. The system includes an Intelligent receiver and a Pico transmitter. The intelligent receiver demodulates a signal received from a Broadcast radio head (BRH) with a HPHT or a LPLT toplogy through an outdoor high gain rooftop antenna that is externally connected to the intelligent receiver. The intelligent receiver includes an artificial intelligence (AI) or Machine learning (ML) based indoor coverage monitoring unit and a Pico transmitter application. The AI/ML based indoor coverage monitoring unit continuously monitors cellular reception factors of indoor user devices. The AI/ML based indoor coverage monitoring unit predicts an optimal indoor modulation profile and selects a required modulation index required for the indoor user devices. The Pico transmitter application re-broadcasts or relays the demodulated signal, based on an optimal indoor modulation profile required for the indoor user devices.

19 Claims, 7 Drawing Sheets

SYSTEM AND METHOD FOR IMPROVING INDOOR COVERAGE OF CELLULAR RECEPTION USING A SMART TELEVISION

This application claims priority to Indian provisional patent application no. 202041003082 filed on Jan. 23, 2020, the complete disclosure of which, in its entirety, is herein incorporated by reference.

BACKGROUND

Technical Field

The embodiments herein generally relate to a home cellular network, and more particularly, a system and method for improving indoor coverage of cellular reception using a smart television and an outdoor high gain rooftop antenna.

Description of the Related Art

Digital terrestrial modulation is a means of transmitting contents to an end-user of a television. For the indoor end user to receive the transmitted contents, the end-user has to use an outdoor antenna or step outside a home where signal loss is less or low data rate service to watch the contents for indoor reception. For wireless signal coverage is based on Indoor reception/Outdoor, Fixed/with mobility, and Line of site/Non-Line of site reception conditions, Now if the contents have to be received on the indoor user device then the user has to add an external outdoor antenna to the user device receiver for receiving the high resolution or high data rate contents from the digital terrestrial modulation. Even though, quality of a signal is affected in the indoor coverage due to antenna gain and height, Fixed/with mobility, and signal loss due to obstacles and distance between the end-user and a source, e.g., a transmission tower. In such cases, the user may feel uncomfortable carrying the external devices or antenna for receiving the contents on the user device. In the indoor reception on handheld devices, e.g., a mobile phone, mobile TV, Tablet, Laptop, provides low data rates as signal loss due to obstacles, e.g., walls, household material, etc. are high and hand-held antenna gain and heights are also less. Accordingly, there remains a need for improving existing approaches for extending indoor coverage of cellular reception.

SUMMARY

In view of the foregoing, embodiments herein provide a system for improving indoor coverage of cellular reception. The system includes an Intelligent receiver and a pico transmitter. The Intelligent receiver demodulates a signal that is received from a Broadcast radio head (BRH) with a High-Power High Tower (HPHT) or a Low-Power Low Tower (LPLT) toplogy through an outdoor high gain rooftop antenna that is externally connected to the indoor Intelligent receiver. The Intelligent receiver includes an artificial intelligence (AI) or Machine learning (ML) based indoor coverage monitoring unit and, a Pico transmitter application. The AI/ML based indoor coverage monitoring unit continuously monitors at least one cellular reception factor of at least one indoor user device. The AI/ML based indoor coverage monitoring unit predicts an optimal indoor modulation profile that is required for the at least one indoor user device. The optimal indoor modulation profile is a mapping between a modulation parameter and indoor coverage that corresponds to the at least one indoor user device. The AI/ML based indoor coverage monitoring unit selects a required modulation index that corresponds to the predicted optimal indoor modulation profile required for the at least one indoor user device based on the at least one cellular reception factor and the indoor coverage. The Pico transmitter application re-broadcasts or relays the demodulated signal, based on the optimal indoor modulation profile required for the at least one indoor user device determined by the AL/ML based indoor coverage monitoring unit. The Pico transmitter re-modulates the demodulated signal and transmits demodulated data with the required modulation index selected by the AL/ML based indoor coverage monitoring unit to the at least one indoor user device.

In some embodiments, the Intelligent receiver is a Smart Television (TV) or any type of receiver.

In some embodiments, the at least one indoor user device includes a digital media controller as a remote-control application that continuously monitors a user interest for one or more contents that are received from the intelligent receiver at the at least one indoor user device and indicates a content that is selected by the user to the intelligent receiver.

In some embodiments, the Pico transmitter application re-broadcasts or relays a selected content to the at least one indoor user device by filtering the selected content from the one or more contents that are received from a content provider server based on the selection of the user, thereby reducing indoor signal congestion.

In some embodiments, the Pico transmitter application re-broadcasts or relays the selected content to the at least one indoor user device based on the modulation parameter selected by the AL/ML based indoor coverage monitoring unit. In some embodiments, the modulation parameter is at least one of Quadrature phase shift keying (QPSK), 16 Quadrature amplitude modulation (QAM), 64 QAM and 256 QAM, Guard Internals, Forward error correction (FEC) code rates, Fast Fourier transform (FFT) size, and pilot patterns.

In some embodiments, the AL/ML based indoor coverage monitoring unit selects the modulation parameter to re-broadcast or relay the selected content to the at least one indoor user device by continuously monitoring the user interest and the at least one cellular reception factor of the at least one indoor user device. In some embodiments, the at least one cellular reception factor is at least one of signal quality, Bit error rate, and multipath profile of the at least one indoor user device.

In some embodiments, the Pico transmitter includes an indoor profile modulation module that re-modulates the demodulated signal to indoor wireless signals by performing an indoor profile modulation. In some embodiments, the indoor wireless signals are a Wi-Fi signal, Advanced Television Systems Committee 3.0 (ATSC3.0), or similar terrestrial modulation signals. In some embodiments, the Pico transmitter transmits the demodulated data with the required modulation index to the at least one indoor user device through a home gateway for the Wi-Fi signal or directly transmits the demodulated data with the required modulation index to the at least one indoor user device for the ATSC3.0 or similar terrestrial modulation signals.

In some embodiments, an AL/ML based content profiler that offloads at least one trending content from a mobile network to the Broadcast radio head (BRH) with the High-Power High Tower (HPHT) or the Low-Power Low Tower (LPLT) toplogy to reduce bandwidth consumption on the mobile network. In some embodiments, the at least one indoor user device receives the at least one trending content from the content provider server through the Broadcast radio head (BRH) with the HPHT or the LPLT toplogy and the intelligent receiver. In some embodiments, the at least one trending content is unicast content or multicast content.

In some embodiments, the at least one indoor user device downloads unicast services using a unique ID associated with the at least one indoor user device.

In some embodiments, the Pico transmitter is an in-built device or external device attached to the intelligent receiver using an interface.

In one aspect, a method for improving indoor coverage of cellular reception is provided. The method includes (i) demodulating, using an Intelligent receiver, a signal that is received from a Broadcast radio head (BRH) with a High-Power High Tower (HPHT) or a Low-Power Low Tower (LPLT) toplogy through an outdoor high gain rooftop antenna that is externally connected to the Intelligent receiver, (ii) continuously monitoring, using an artificial intelligence (AI) or Machine learning (ML) based indoor coverage monitoring unit of the Intelligent receiver, at least one cellular reception factor of at least one indoor user device, (iii) predicting, using the AI or ML based indoor coverage monitoring unit of the Intelligent receiver, an optimal indoor modulation profile that is required for the at least one indoor user device, (iv) selecting, using the AI or ML based indoor coverage monitoring unit of the Intelligent receiver, a required modulation index that corresponds to the predicted optimal indoor modulation profile required for the at least one indoor user device based on the at least one cellular reception factor and the indoor coverage, (v) re-broadcasting or relaying, using a Pico transmitter application of the Intelligent receiver, the demodulated signal based on the optimal indoor modulation profile required for the at least one indoor user device determined by the AL/ML based indoor coverage monitoring unit, and (vi) re-modulating, using a Pico transmitter, the demodulated signal and transmits demodulated data with the required modulation index selected by the AL/ML based indoor coverage monitoring unit to the at least one indoor user device. The optimal indoor modulation profile is a mapping between a modulation parameter and indoor coverage that corresponds to the at least one indoor user device.

In some embodiments, the method includes continuously monitoring, using a digital media controller of the at least one indoor user device, a user interest for one or more contents that are received from the intelligent receiver at the at least one indoor user device and indicating a content that is selected by the user to the intelligent receiver.

In some embodiments, the method includes re-broadcasting or relaying, using the Pico transmitter application, a selected content to the at least one indoor user device by filtering the selected content from the one or more contents that are received from a content provider server based on the selection of the user, thereby reducing indoor signal congestion.

In some embodiments, the Pico transmitter application re-broadcasts or relays the selected content to the at least one indoor user device based on the modulation parameter selected by the AL/ML based indoor coverage monitoring unit. In some embodiments, the modulation parameter is at least one of Quadrature phase-shift keying (QPSK), 16 Quadrature amplitude modulation (QAM), 64 QAM and 256 QAM, Guard Internals, Forward error correction (FEC) code rates, Fast Fourier transform (FFT) size, and pilot patterns.

In some embodiments, selecting the modulation parameter to re-broadcast or relay the selected content to the at least one indoor user device includes continuously monitoring the user interest and the at least one cellular reception factor of the at least one indoor user device using the AL/ML based indoor coverage monitoring unit. In some embodiments, the at least one cellular reception factor is at least one of signal quality, Bit error rate, and multipath profile of the at least one indoor user device.

In some embodiments, re-modulating the demodulated signal includes performing an indoor profile modulation to re-modulate the demodulated signal to indoor wireless signals. In some embodiments, the indoor wireless signals are a Wi-Fi signal, or Advanced Television Systems Committee 3.0 (ATSC3.0), or similar terrestrial modulation signals. In some embodiments, the Pico transmitter transmits the demodulated data with the required modulation index to the at least one indoor user device through a home gateway for the Wi-Fi signal or directly transmits the demodulated data with the required modulation index to the at least one indoor user device for the ATSC3.0 or similar terrestrial modulation signals.

In some embodiments, the method includes offloading, using an AL/ML based content profiler, at least one trending content from a mobile network to the Broadcast radio head (BRH) with the High-Power High Tower (HPHT) or the Low-Power Low Tower (LPLT) toplogy to reduce bandwidth consumption on the mobile network. In some embodiments, the at least one indoor user device receives the at least one trending content from the content provider server through the Broadcast radio head (BRH) with the HPHT or the LPLT toplogy and the intelligent receiver. In some embodiments, the at least one trending content is unicast content or multicast content.

In some embodiments, the method includes downloading, at the at least one indoor user device, unicast services using a unique ID associated with the at least one indoor user device.

In some embodiments, the Pico transmitter is an in-built device or external device attached to the intelligent receiver using an interface.

The system and method reduce indoor signal congestion and reduce bandwidth consumption on a mobile network to provide outdoor reception quality to indoor handheld devices. The system and method reduce signal loss due to obstacles such as walls, household materials, etc. at the indoor coverage.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
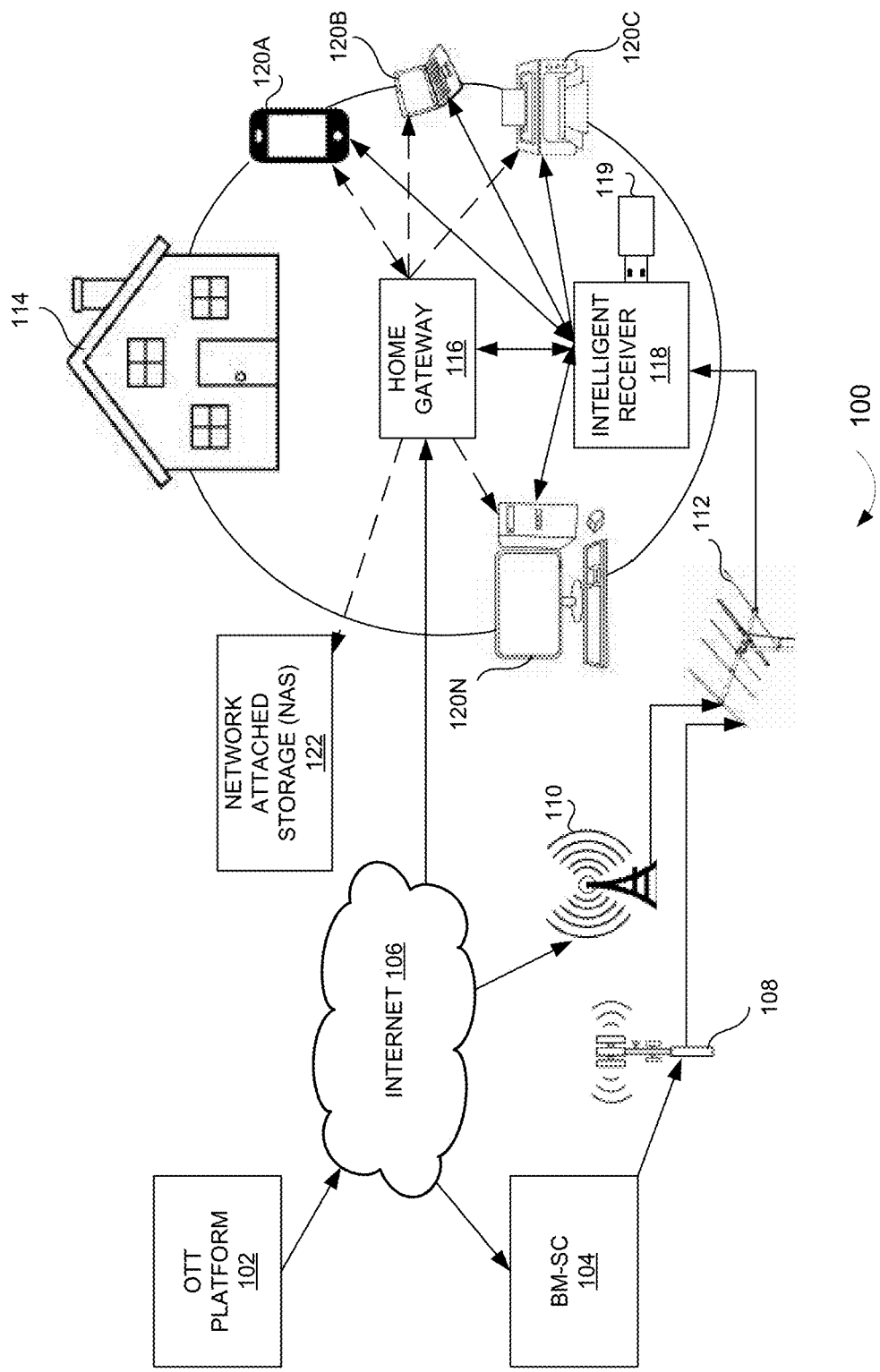
FIG. 1 is a block diagram that illustrates a system for improving indoor coverage of cellular reception at a home according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for improving indoor coverage of cellular reception, thereby reducing indoor signal congestion and reduce bandwidth consumption on a mobile network to provide outdoor reception quality to indoor handheld devices and reducing signal loss due to obstacles such as walls, household materials, etc. at the indoor coverage. Referring now to the drawings, and more particularly to FIGS. 1 through 6, where similar reference characters denote corresponding features consistently throughout the figures, there are shown preferred embodiments.

Definitions

Modulation Index: The modulation index of a modulation scheme describes a particular set of modulation parameters and transmission power to be applied to reach a receiving device.

Mobile Network: A Cellular network or mobile network is a radio network distributed over land areas called cells, each served by at least one fixed-location transceiver, known as a cell site or] base station.

FIG. 1 is a block diagram 100 that illustrates a system for improving indoor coverage of cellular reception at a home 114 according to some embodiments herein. The block diagram 100 includes an OverTheTop (OTT) platform 102, a broadcast multicast service center (BM-SC) 104, the internet 106, a broadcast radio head (BRH) with a High-Power High Tower (HPHT) or a Low-Power Low Tower (LPLT) topology 108, a transmission tower 110, an outdoor high gain rooftop antenna 112 that is connected at rooftop of the home 114. The home 114 includes a home gateway 116, an intelligent receiver 118 that is connected with a Pico transmitter 119, one or more indoor user devices 120A-N and a network attached storage (NAS) 122.

In some embodiments, the one or more indoor user devices 120A-N without limitation, may be selected from a mobile 120A, a tablet, a laptop 120B, a printer 120C, or a desktop 120N. In some embodiments, the broadcast radio head (BRH) with the HPHT or the LPLT topology 108 involves single or multiple transmit chains for receiving TV contents from a digital terrestrial modulation. In some embodiments, the digital terrestrial modulation is Advanced Television Systems Committee 3.0 (ATSC3.0) which is transmitted to the intelligent receiver 118 through the BRH with the HPHT or LPLT topology 108 and the transmission tower 110. In some embodiments, the Broadcast Multicast Service Center (BM-SC) 104 connects to Mobile Broadcast and Multicast Service (MBMS) content providers and transmits and schedules MBMS services to the BRH with the HPHT or LPLT topology 108. The one or more indoor user devices 120A-N may include single or multiple antennas, a Radio Frequency (RF), and signal processing chains based on whether it is optimized for cost, power, or performance. For example, the one or more indoor user devices 120A-N in a form of a smartphone or the tablet are likely to have a single antenna and a single RF chain due to constraints of power and form factor.

In some embodiments, the OTT platform 102 communicates with a content delivery network (CDN). The OTT platform 102 is a streaming media service offered directly to the users via the internet 106. The OTT platform 102 may be hot star, ZeeTV, and the like. The CDN delivers a transmission stream of a streaming media content to the one or more indoor user devices 120A-N of the home gateway 116 through the internet 106.

The Intelligent receiver 118 demodulates a signal that is received from the broadcast radio head (BRH) with the HPHT or the LPLT topology 108 through the outdoor high gain rooftop antenna 112 that is externally connected to the Intelligent receiver 118. In some embodiments, the indoor coverage of the signal is improved using the outdoor high gain rooftop antenna 112, e.g., Yagi antenna. The outdoor high gain rooftop antenna 112 is a directional antenna that includes a driven element such as dipole or folded dipole and additional parasitic elements, typically a reflector and one or more directors.

The Intelligent receiver 118 continuously monitors cellular reception factors of the one or more indoor user devices 120A-N. In some embodiments, the cellular reception factors are at least one of signal quality, Bit error rate, and multipath profile of the one or more indoor user devices 120A-N. The Intelligent receiver 118 predicts an optimal indoor modulation profile that is required for the one or more indoor user devices 120A-N. The optimal indoor modulation profile is a mapping between a modulation parameter and indoor coverage that corresponds to the one or more indoor user devices 120A-N. In some embodiments, the modulation parameter is at least one of Quadrature phase-shift keying (QPSK), 16 Quadrature amplitude modulation (QAM), 64 QAM and 256 QAM, Guard Internals such as ¼, ⅛, 1/16, 1/32, Forward error correction (FEC) code rates such as 2/15 to 14/15, Fast Fourier transform (FFT) size such as 512, 1024, 2048, 8192, and pilot patterns. The Intelligent receiver 118 selects a required modulation index that corresponds to the predicted optimal indoor modulation profile required for the one or more indoor user devices 120A-N based on the cellular reception factors and the indoor coverage. The intelligent receiver 118 re-broadcasts or relays the demodulated signal, based on the optimal indoor modulation profile required for the one or more indoor user devices 120A-N. The Pico transmitter 119 re-modulates the demodulated signal and transmits demodulated data with the required modulation index to the one or more indoor user devices 120A-N.

The intelligent receiver 118 demodulates the signal received over the outdoor high gain rooftop antenna 112 with low signal loss and transmits the demodulated signal as indoor wireless signals such as Wi-Fi standards, ATSC3.0, or similar terrestrial modulation signals such as DVB-T2/DVBT to the one or more indoor user devices 120A-N. The intelligent receiver 118 may be a Smart Television (TV) or any type of receiver. The smart television may include the Advanced Television Systems Committee 3.0 (ATSC3.0) or similar DTV standards DVB-T2/DVBT. The Advanced Television Systems Committee 3.0 (ATSC3.0) or and DVB-T2 receiver demodulates the signal and transmits the demodulated signal to the one or more indoor user devices 120A-N of the home gateway 116 through a Wi-Fi or the Pico transmitter 119 of ATSC3.0/DVB-T2. In some embodiments, the Wi-Fi may include backhaul connectivity.

In some embodiments, the smart television is a digital content server. The network attached storage (NAS) 122 stores the TV contents for enabling the users to view the TV contents at the one or more indoor user devices 120A-N offline.

The transmission tower 110 may transmit the TV contents up to 54 Mbps to 60 Mbps through a data pipe to the intelligent receiver 118. The 54 Mbps to 60 Mbps provides 54 channels or 60 channels of SD resolution. The user may select any at least one channel through the digital media controller to view the TV contents on the one or more indoor user devices 120A-N using the digital media player. In some embodiments, the digital media controller and the digital media player are designed based on a Digital Living Network Alliance (DLNA). The DLNA is a set of interoperability guidelines for sharing digital media among multimedia devices.

In some embodiments, the one or more indoor user devices 120A-N of the home gateway 116 may include a digital media controller and a digital media player. The digital media controller running on a corresponding user device may act as a remote for streaming the TV contents on the one or more indoor user devices 120A-N or to stop streaming the TV contents on the one or more indoor user devices 120A-N. The digital media player allows a user of the one or more indoor user devices 120A-N to play the TV contents received from the intelligent receiver 118 through the Wi-Fi or the Pico transmitter 119 of ATSC3.0/DVB-T2. In some embodiments, the digital media controller and the digital media player includes a set of instructions to act as a remote for streaming the TV contents on the one or more indoor user devices 120A-N or to stop streaming the TV contents on the one or more indoor user devices 120A-N through the Wi-Fi.

Figure 2:
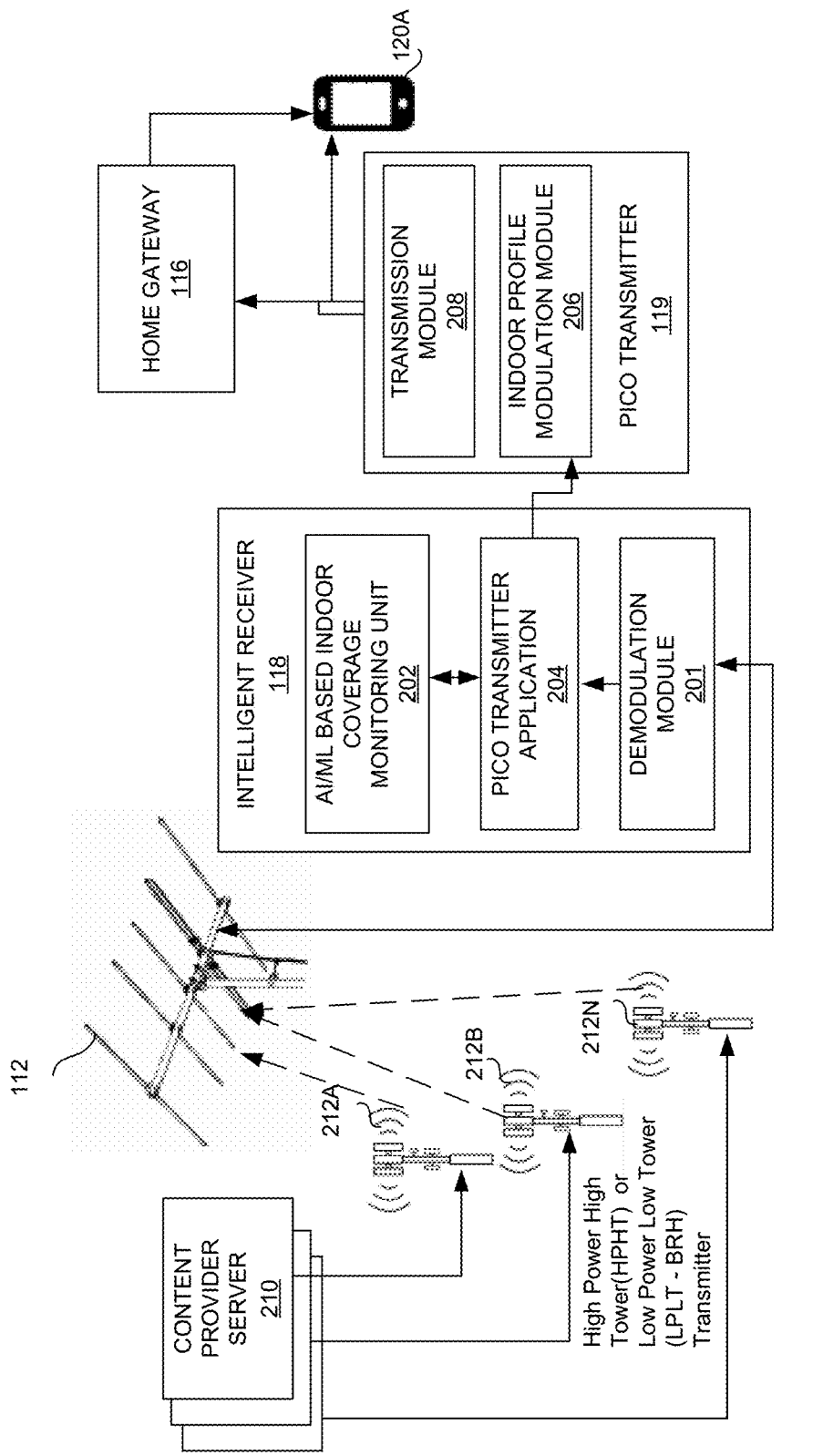
FIG. 2 is a block diagram of an intelligent receiver according to some embodiments herein.

FIG. 2 is a block diagram 200 of the intelligent receiver 118 according to some embodiments herein. The intelligent receiver 118 includes a demodulation module 201, an artificial intelligence (AI) or Machine learning (ML) based indoor coverage monitoring unit 202, and a Pico transmitter application 204. The demodulation module 201 demodulates a signal that is received from Broadcast radio heads (BRHs) with a High-Power High Tower (HPHT) or a Low-Power Low Tower (LPLT) toplogy 212A-N through the outdoor high gain rooftop antenna 112 that is externally connected to the intelligent receiver 118. In some embodiments, the Broadcast radio heads (BRHs) with the HPHT or the LPLT toplogy 212A-N transmits digital contents that are received from a content provider server 210. The content provider server 210 may be associated with an online video publisher, e.g., YouTube by Google, Inc., Amazon Prime Video by Amazon, Inc., Apple TV by Apple, Inc., Hulu and Disney Plus by The Walt Disney Company, Netflix by Netflix, Inc., CBS All Access by ViacomCBS, Yahoo Finance by Verizon Media, etc., and/or an advertiser, e.g., Alphabet, Inc, Amazon Inc, Facebook, Instagram, etc. In some embodiments, the content provider server 210 is associated with a media company, e.g., Warner Media, News Corp, The Walt Disney Company, etc.

The artificial intelligence (AI) or Machine learning (ML) based indoor coverage monitoring unit 202 continuously monitors cellular reception factors of an indoor user device 120A, e.g., a mobile phone. The cellular reception factors are at least one of signal quality, Bit error rate, and multipath profile of the indoor user device 120A. The AI/ML based indoor coverage monitoring unit 202 predicts an optimal indoor modulation profile that is required for the indoor user device 120A. The optimal indoor modulation profile is a mapping between a modulation parameter and indoor coverage that corresponds to the indoor user device 120A. The AI/ML based indoor coverage monitoring unit 202 selects a required modulation index that corresponds to the predicted optimal indoor modulation profile required for the indoor user device 120A based on the cellular reception factors and the indoor coverage.

The Pico transmitter application 204 re-broadcasts or relays the demodulated signal, based on the optimal indoor modulation profile required for the indoor user device 120A determined by the AL/ML based indoor coverage monitoring unit 202. The Pico transmitter 119 re-modulates the demodulated signal and transmits demodulated data with the required modulation index selected by the AL/ML based indoor coverage monitoring unit 202 to the indoor user device 120A.

In some embodiments, the indoor user device 120A includes a digital media controller as a remote-control application that continuously monitors a user interest for one or more contents that are received from the intelligent receiver 118 at the indoor user device 120A and indicates a content that is selected by a user to the intelligent receiver 118. The digital media controller may enable the user to schedule recording or store the content to the network attached storage (NAS) 122 associated with the home gateway 116.

In some embodiments, the Pico transmitter application 204 re-broadcasts or relays a selected content to the indoor user device 120A by filtering the selected content from the one or more contents that are transmitted to the indoor user device 120A based on the selection of the user, thereby reducing indoor signal congestion. The Pico transmitter application 204 may re-broadcast or relay the selected content to the indoor user device 120A based on the modulation parameter selected by the AL/ML based indoor coverage monitoring unit 202. In some embodiments, the modulation parameter is at least one of Quadrature phase-shift keying (QPSK), 16 Quadrature amplitude modulation (QAM), 64 QAM and 256 QAM, Guard Internals, Forward error correction (FEC) code rates, Fast Fourier transform (FFT) size, and pilot patterns. For example, if the indoor coverage is a single room without any obstacles in between then 16 or 64-QAM modulation is selected. If the indoor coverage profile spans over multiple floors and multiple rooms within between concrete walls then QPSK modulation is selected. For example, the modulation parameter such as a line of site (64-QAM), across multiple floors (QPSK), and multiple concrete walls (QPSK).

In some embodiments, the AL/ML based indoor coverage monitoring unit 202 selects the modulation parameter to re-broadcast or relay the selected content to the indoor user device 120A by continuously monitoring the user interest and the cellular reception factors of the indoor user device 120A. In some embodiments, the Pico transmitter 119 includes an indoor profile modulation module 206 that re-modulates the demodulated signal to indoor wireless signals by performing an indoor profile modulation. The indoor wireless signals may be a Wi-Fi signal, Advanced Television Systems Committee 3.0 (ATSC3.0), or similar terrestrial modulation signals such as DVB-T2/DVBT. The Pico transmitter 119 transmits the demodulated data with the required modulation index to the indoor user device 120A through the home gateway 116 for the Wi-Fi signal or directly transmits the demodulated data with the required modulation index to the indoor user device 120A for the ATSC3.0 using a transmission module 208. The Pico transmitter 119 may transmit the demodulated data with the required modulation index to the indoor user device 120A using a transmitter antenna that is connected with the Pico transmitter 119. In some embodiments, the Pico transmitter 119 is an in-built device or an external device attached to the intelligent receiver 118 using an interface.

Figure 3:
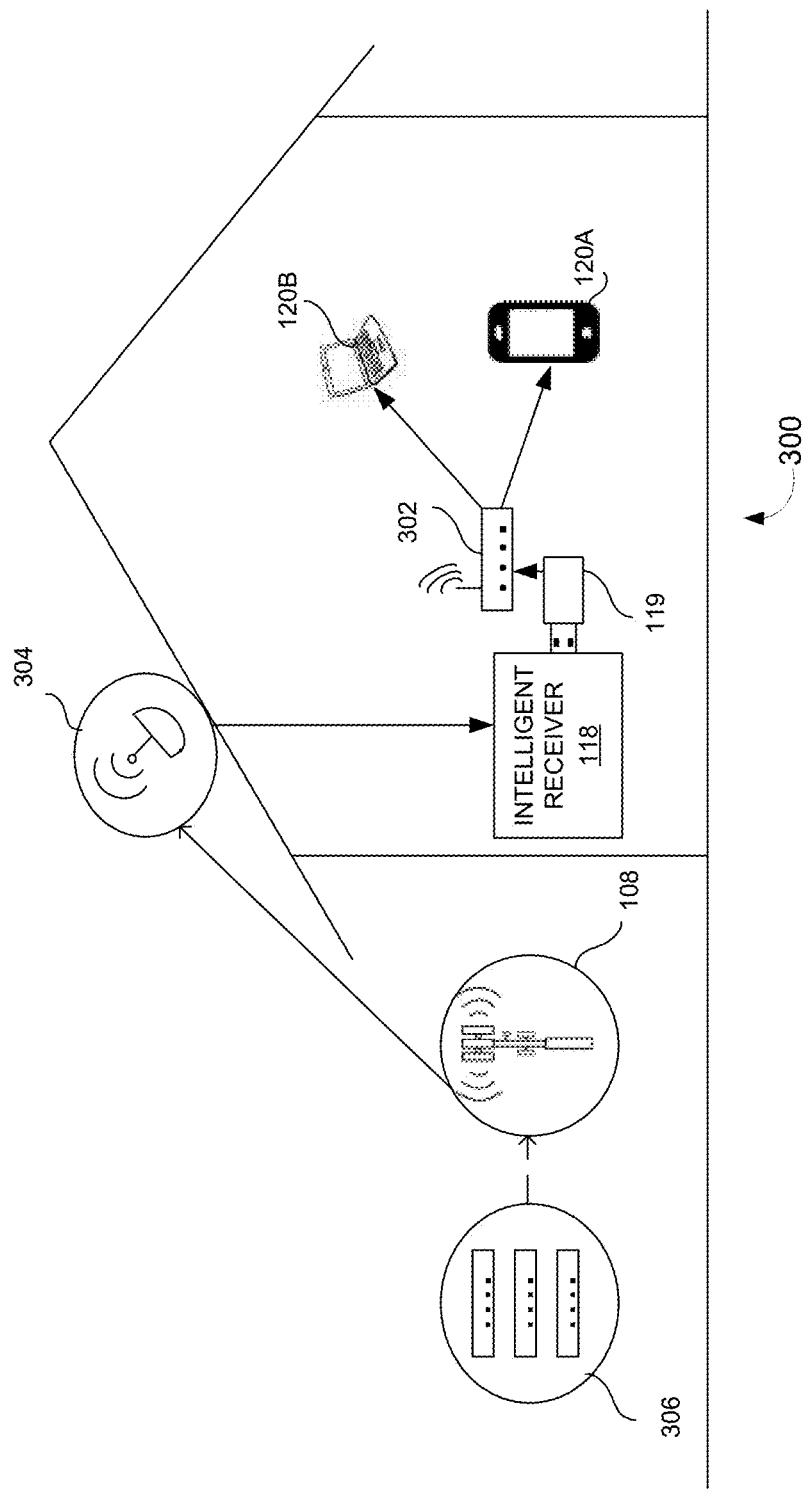
FIG. 3 is a block diagram of a home gateway associated with a broadcast radio head (BRH) with a High-Power High Tower (HPHT) or a Low-Power Low Tower (LPLT) topolgy topology according to some embodiments herein.

FIG. 3 is a block diagram of the home gateway 116 associated with the broadcast radio head (BRH) with the HPHT or the LPLT topology 108 according to some embodiments herein. The block diagram 300 includes the intelligent receiver 118, the one or more indoor user devices 120A-B, the broadcast radio head (BRH) with the HPHT or the LPLT topology 108, a wireless gateway (Wi-Fi) 302, a fixed wireless antenna 304, and a data center 306.

The intelligent receiver 118 receives a signal over the fixed wireless antenna 304 with low signal loss from the data center 306 through the transmission tower 110 and demodulates the signal to indoor wireless signals such as Wi-Fi standards, ATSC3.0 similar terrestrial modulation signals such as DVB-T2/DVBT. The Pico transmitter 119 of the intelligent receiver 118 may transmit demodulated data with a required modulation index to the one or more indoor user devices 120A-B through the wireless gateway (Wi-Fi) 302.

Figure 4:
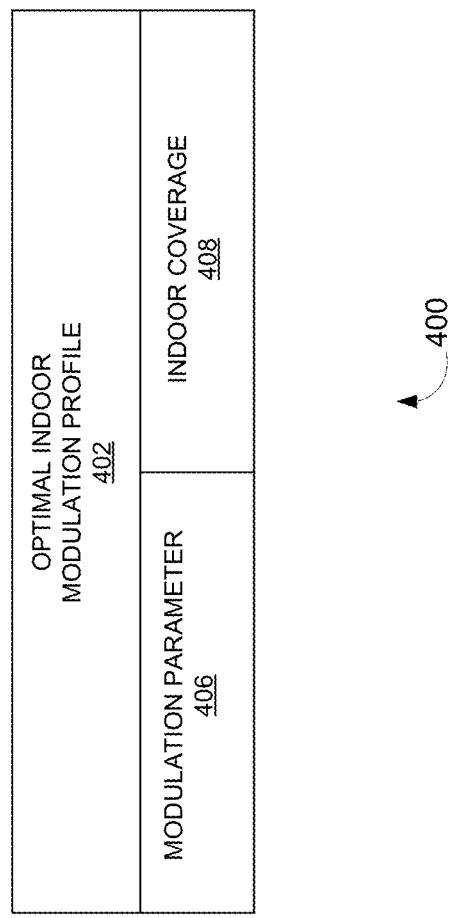
FIG. 4 is a table view of a mapping between a modulation parameter and indoor coverage according to some embodiments herein.

FIG. 4 is a table view 400 of a mapping between a modulation parameter 406 and indoor coverage 408 according to some embodiments herein. The table view 400 includes an optimal indoor modulation profile 402 required for the one or more indoor user devices 120A-N. The optimal indoor modulation profile 402 is the mapping between the modulation parameter 406 and the indoor coverage 408 that corresponds to the one or more indoor user devices 120A-N. In some embodiments, the modulation parameter 406 is 16 or 64 or 256-Quadrature Amplitude Modulation (QAM) modulation, or Quadrature Phase Shift Keying (QPSK) modulation, guard intervals such as ¼.⅛, 1/16, 1/32, FFT (Fast Fourier transform) sizes such as 512, 2014, 2048, 8192. For example, if the indoor coverage 408 is a single room without any obstacles in between then 16 or 64-QAM modulation, guard interval 1/32, and FFT size 2048 are selected. If the indoor coverage 408 profile spans over multiple floors and multiple rooms within between concrete walls then QPSK modulation is selected. For example, the modulation parameter 406 such as a line of site (64-QAM), across multiple floors (QPSK), and multiple concrete walls (QPSK).

Figure 5A:
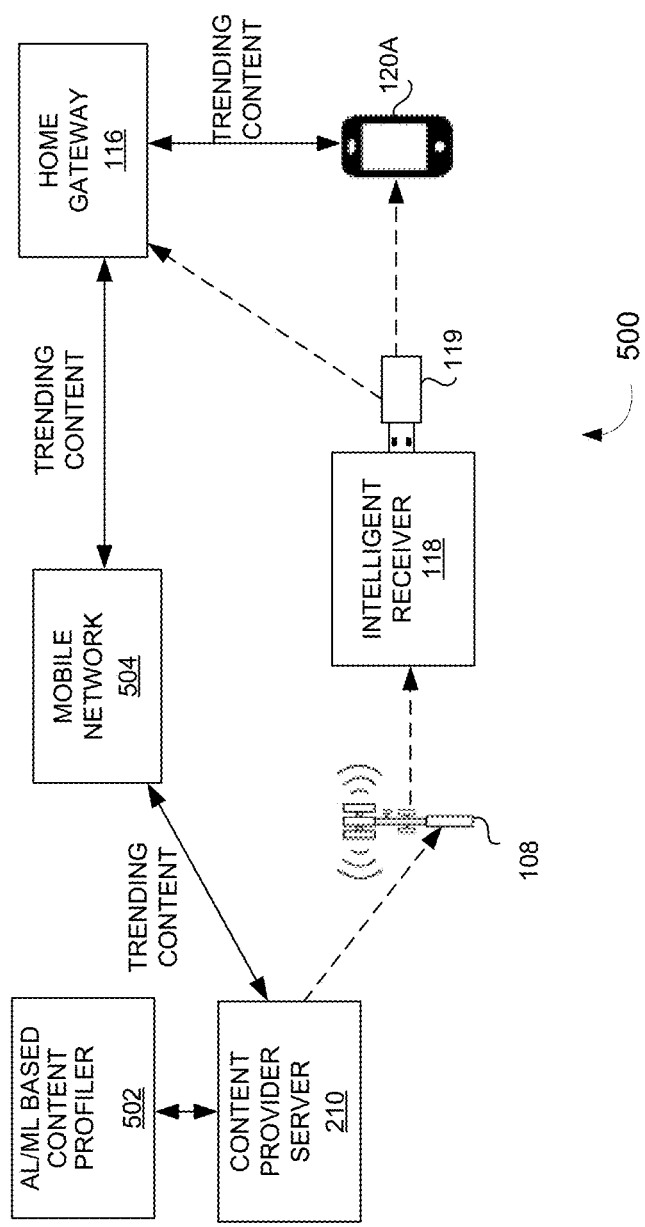
FIGS. 5A-5B are block diagrams that illustrate offloading of a trending content from a mobile network to a broadcast network according to some embodiments herein.

FIG. 5A is a block diagram 500 that illustrates offloading of a trending content from a mobile network 504 to a broadcast network according to some embodiments herein. The block diagram 500 includes the home gateway 116, the intelligent receiver 118 associated with the Pico transmitter 119, the indoor user device 120A, e.g.,a mobile phone, an AL/ML based content profiler 502 associated with the content provider server 210, and the mobile network 504. The indoor user device 120A receives the trending content, e.g., social news and entertainment such as a video, a song, etc. from the content provider server 210 through the mobile network 504.

Figure 5B:
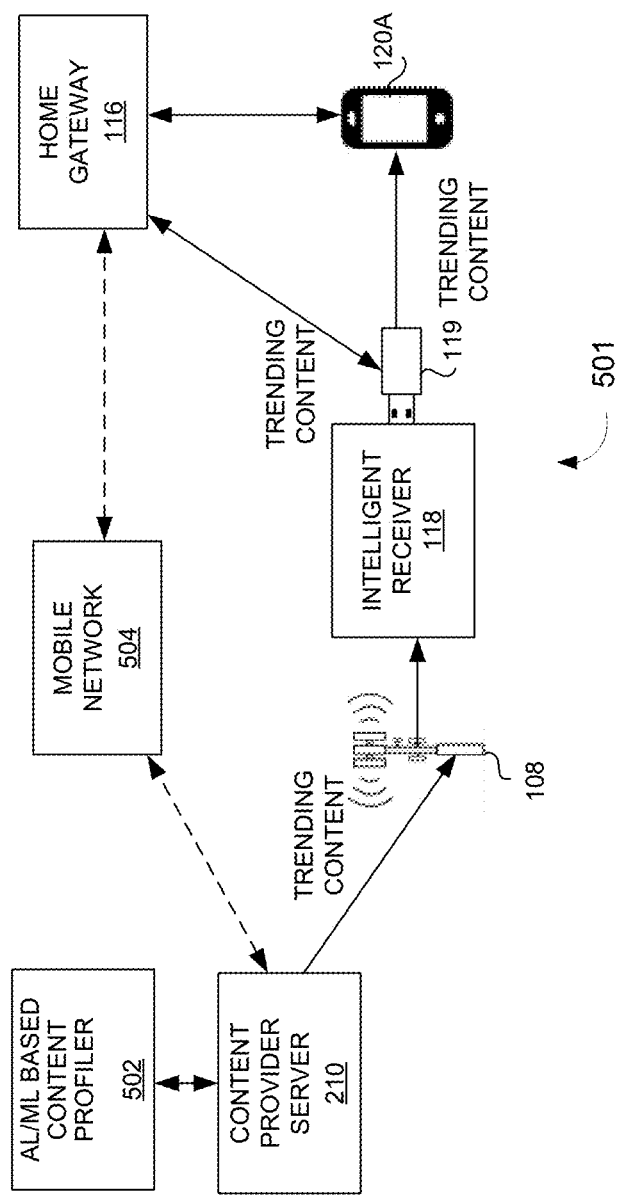

With reference to the FIG. 5A, FIG. 5B is a block diagram 501 that illustrates offloading of the trending content from the mobile network 504 of the indoor user device 120A to the broadcast network according to the embodiments herein. The AL/ML based content profiler 502 offloads the trending content from the mobile network 504 to the Broadcast radio head (BRH) with the High-Power High Tower (HPHT) or the Low-Power Low Tower (LPLT) toplogy 108 to reduce bandwidth consumption on the mobile network 504. The one or more indoor user devices 120A-N receive the trending content from the content provider server 210 through the Broadcast radio head (BRH) with the High-Power High Tower (HPHT) or the Low-Power Low Tower (LPLT) toplogy 108 and the intelligent receiver 118. The trending content may be unicast content or multicast content. In some embodiments, the indoor user device 120A downloads unicast services using a unique ID associated with the indoor user device 120A.

Figure 6:
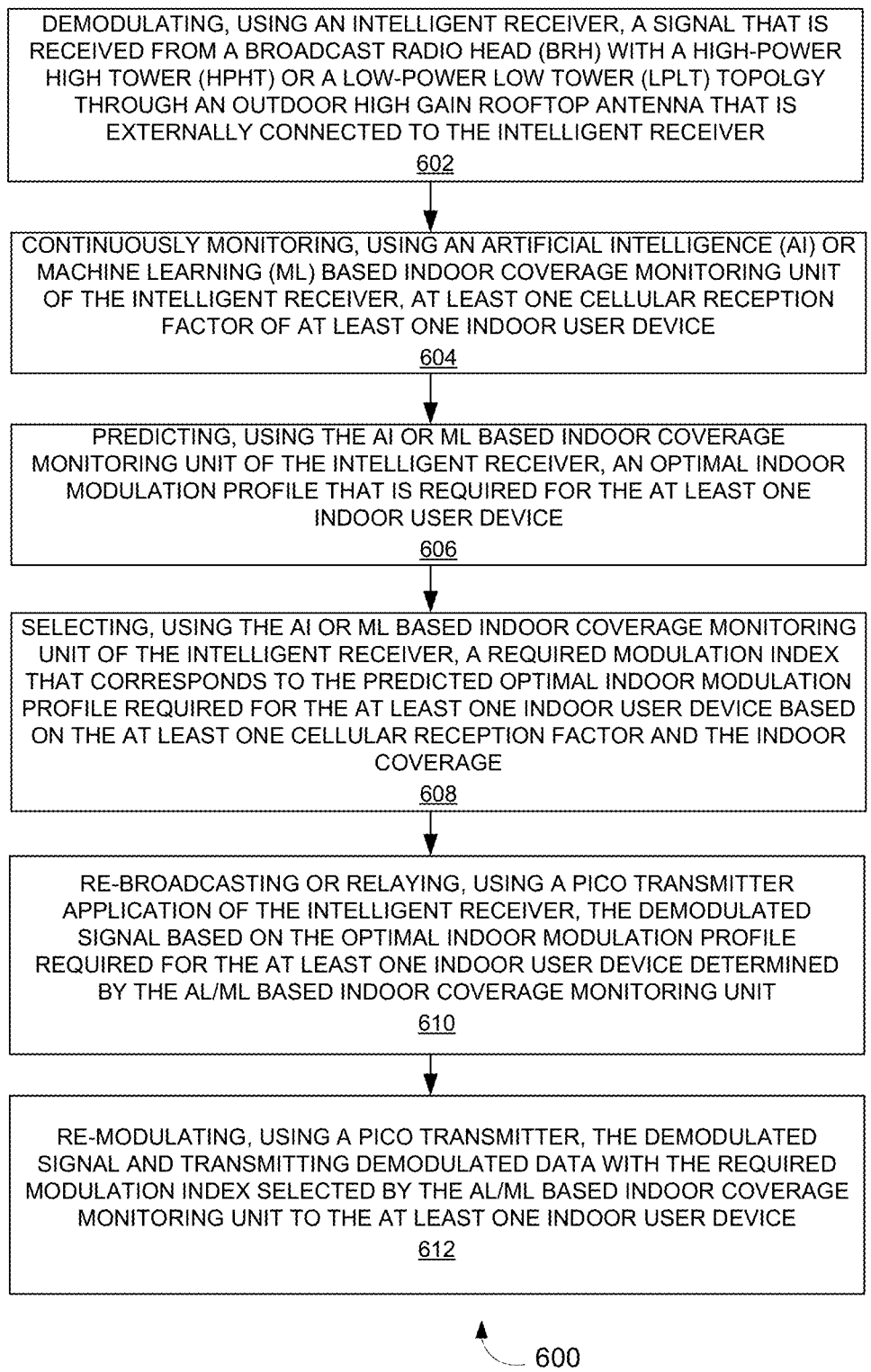
FIG. 6 is a flow diagram that illustrates a method for improving indoor coverage of cellular reception according to some embodiments herein.

FIG. 6 is a flow diagram that illustrates a method 600 for improving the indoor coverage 408 of cellular reception according to some embodiments herein. At step 602, the method 600 includes demodulating, using the intelligent receiver 118, a signal that is received the Broadcast radio head (BRH) with the High-Power High Tower (HPHT) or the Low-Power Low Tower (LPLT) toplogy 108 through the outdoor high gain rooftop antenna 112 that is externally connected to the intelligent receiver 118. At step 604, the method 600 includes continuously monitoring, using the artificial intelligence (AI) or Machine learning (ML) based indoor coverage monitoring unit 202 of the intelligent receiver 118, cellular reception factors of the one or more indoor user devices 120A-N. At step 606, the method 600 includes predicting, using the AI or ML based indoor coverage monitoring unit 202 of the intelligent receiver 118, an optimal indoor modulation profile that is required for the one or more indoor user devices 120A-N. The optimal indoor modulation profile is a mapping between the modulation parameter 406 and the indoor coverage 408 that corresponds to the one or more indoor user devices 120A-N. At step 608, the method 600 includes selecting, using the AI or ML based indoor coverage monitoring unit 202 of the intelligent receiver 118, a required modulation index that corresponds to the predicted optimal indoor modulation profile required for the one or more indoor user devices 120A-N based on the cellular reception factors and the indoor coverage 408. At step 610, the method 600 includes re-broadcasting or relaying, using the Pico transmitter application 204 of the intelligent receiver 118, the demodulated signal based on the optimal indoor modulation profile required for the one or more indoor user devices 120A-N determined by the AL/ML based indoor coverage monitoring unit 202. At step 612, the method 600 includes re-modulating, using the Pico transmitter 119, the demodulated signal, and transmitting demodulated data with the required modulation index selected by the AL/ML based indoor coverage monitoring unit 202 to the one or more indoor user devices 120A-N.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for improving indoor coverage of cellular reception, said system comprising:
    an intelligent receiver that demodulates a signal that is received from a Broadcast radio head (BRH) with a High-Power High Tower (HPHT) or a Low-Power Low Tower (LPLT) toplogy through an outdoor high gain rooftop antenna that is externally connected to the intelligent receiver, wherein the intelligent receiver comprises
        an artificial intelligence (AI) or Machine learning (ML) based indoor coverage monitoring unit that
            (i) continuously monitors at least one cellular reception factor of at least one indoor user device,
            (ii) predicts an optimal indoor modulation profile that is required for the at least one indoor user device, wherein the optimal indoor modulation profile is a mapping between a modulation parameter and the indoor coverage that corresponds to the at least one indoor user device; and
            (iii) selects a required modulation index that corresponds to the predicted optimal indoor modulation profile required for the at least one indoor user device based on the at least one cellular reception factor and the indoor coverage; and
        a Pico transmitter application that re-broadcasts or relays the demodulated signal, based on the optimal indoor modulation profile required for the at least one indoor user device determined by the AL/ML based indoor coverage monitoring unit; and
        a Pico transmitter that re-modulates the demodulated signal and transmits demodulated data with the required modulation index selected by the AL/ML based indoor coverage monitoring unit to the at least one indoor user device.

2. The system of claim 1, wherein the intelligent receiver is a Smart Television (TV) or any type of receiver.

3. The system of claim 1, wherein the at least one indoor user device comprises a digital media controller as a remote-control application that continuously monitors a user interest for a plurality of contents that are received from the intelligent receiver at the at least one indoor user device and indicates a content that is selected by a user to the intelligent receiver.

4. The system of claim 3, wherein the Pico transmitter application re-broadcasts or relays a selected content to the at least one indoor user device by filtering the selected content from the plurality of contents that are received from a content provider server based on the selection of the user, thereby reducing indoor signal congestion.

5. The system of claim 4, wherein the Pico transmitter application re-broadcasts or relays the selected content to the at least one indoor user device based on the modulation parameter selected by the AL/ML based indoor coverage monitoring unit, wherein the modulation parameter is at least one of Quadrature phase-shift keying (QPSK), 16 Quadrature amplitude modulation (QAM), 64 QAM and 256 QAM, Guard Internals, Forward error correction (FEC) code rates, Fast Fourier transform (FFT) size, and pilot patterns.

6. The system of claim 5, wherein the AL/ML based indoor coverage monitoring unit selects the modulation parameter to re-broadcast or relay the selected content to the at least one indoor user device by continuously monitoring the user interest and the at least one cellular reception factor of the at least one indoor user device, wherein the at least one cellular reception factor is at least one of signal quality, Bit error rate and multipath profile of the at least one indoor user device.

7. The system of claim 1, wherein the Pico transmitter comprises an indoor profile modulation module that re-modulates the demodulated signal to indoor wireless signals by performing an indoor profile modulation, wherein the indoor wireless signals are a Wi-Fi signal, or Advanced Television Systems Committee 3.0 (ATSC3.0) or similar terrestrial modulation signals, wherein the Pico transmitter transmits the demodulated data with the required modulation index to the at least one indoor user device through a home gateway for the Wi-Fi signal or directly transmits the demodulated data with the required modulation index to the at least one indoor user device for the ATSC3.0.

8. The system of claim 1, wherein the system comprises an AL/ML based content profiler that offloads at least one trending content from a mobile network to the Broadcast radio head (BRH) with the High-Power High Tower (HPHT) or the Low-Power Low Tower (LPLT) toplogy to reduce bandwidth consumption on the mobile network, wherein the at least one indoor user device receives the at least one trending content from the content provider server through the Broadcast radio head (BRH) with the HPHT or the LPLT toplogy and the intelligent receiver, wherein the at least one trending content is unicast content or multicast content.

9. The system of claim 8, wherein the at least one indoor user device downloads unicast services using a unique ID associated with the at least one indoor user device.

10. The system of claim 1, wherein the Pico transmitter is an in-built device or an external device attached to the intelligent receiver using an interface.

11. A method for improving indoor coverage of cellular reception, said method comprising:
    demodulating, using an intelligent receiver, a signal that is received from a Broadcast radio head (BRH) with a High-Power High Tower (HPHT) or a Low-Power Low Tower (LPLT) toplogy through an outdoor high gain rooftop antenna that is externally connected to the intelligent receiver;
    continuously monitoring, using an artificial intelligence (AI) or Machine learning (ML) based indoor coverage monitoring unit of the intelligent receiver, at least one cellular reception factor of at least one indoor user device;
    predicting, using the AI/ML based indoor coverage monitoring unit of the intelligent receiver, an optimal indoor modulation profile that is required for the at least one indoor user device, wherein the optimal indoor modulation profile is a mapping between a modulation parameter and the indoor coverage that corresponds to the at least one indoor user device;
    selecting, using the AI/ML based indoor coverage monitoring unit of the intelligent receiver, a required modulation index that corresponds to the predicted optimal indoor modulation profile required for the at least one indoor user device based on the at least one cellular reception factor and the indoor coverage;

re-broadcasting or relaying, using a Pico transmitter application of the intelligent receiver, the demodulated signal based on the optimal indoor modulation profile required for the at least one indoor user device determined by the AL/ML based indoor coverage monitoring unit; and re-modulating, using a Pico transmitter, the demodulated signal and transmits demodulated data with the required modulation index selected by the AL/ML based indoor coverage monitoring unit to the at least one indoor user device.

12. The method of claim 11, further comprising continuously monitoring, using a digital media controller of the at least one indoor user device, a user interest for a plurality of contents that are received from the intelligent receiver at the at least one indoor user device and indicating a content that is selected by the user to the intelligent receiver.

13. The method of claim 12, further comprising re-broadcasting or relaying, using the Pico transmitter application, a selected content to the at least one indoor user device by filtering the selected content from the plurality of contents that are received from a content provider server based on the selection of the user, thereby reducing indoor signal congestion.

14. The method of claim 13, wherein the Pico transmitter application re-broadcasts or relays the selected content to the at least one indoor user device based on the modulation parameter selected by the AL/ML based indoor coverage monitoring unit, wherein the modulation parameter is at least one of Quadrature phase-shift keying (QPSK), 16 Quadrature amplitude modulation (QAM), 64 QAM and 256 QAM, Guard Internals, Forward error correction (FEC) code rates, Fast Fourier transform (FFT) size, and pilot patterns.

15. The method of claim 14, wherein selecting the modulation parameter to re-broadcast or relay the selected content to the at least one indoor user device comprises continuously monitoring the user interest and the at least one cellular reception factor of the at least one indoor user device using the AL/ML based indoor coverage monitoring unit, wherein the at least one cellular reception factor is at least one of signal quality, Bit error rate and multipath profile of the at least one indoor user device.

16. The method of claim 11, wherein re-modulating the demodulated signal comprises performing an indoor profile modulation to re-modulate the demodulated signal to indoor wireless signals, wherein the indoor wireless signals are a Wi-Fi signal, or Advanced Television Systems Committee 3.0 (ATSC3.0) or similar terrestrial modulation signals, wherein the Pico transmitter transmits the demodulated data with the required modulation index to the at least one indoor user device through a home gateway for the Wi-Fi signal or directly transmits the demoadulated data with the required modulation index to the at least one indoor user device for the ATSC3.0.

17. The method of claim 11, further comprising offloading, using an AL/ML based content profiler, at least one trending content from a mobile network to the Broadcast radio head (BRH) with the High-Power High Tower (HPHT) or the Low-Power Low Tower (LPLT) toplogy to reduce bandwidth consumption on the mobile network, wherein the at least one indoor user device receives the at least one trending content from the content provider server through the Broadcast radio head (BRH) with the HPHT or the LPLT toplogy and the intelligent receiver, wherein the at least one trending content is unicast content or multicast content.

18. The method of claim 11, wherein the method comprises downloading, at the at least one indoor user device, unicast services using a unique ID associated with the at least one indoor user device.

19. The method of claim 11, wherein the Pico transmitter is an in-built device or an external device attached to the intelligent receiver using an interface.

* * * * *